United States Patent [19]

Ekwall

[11] Patent Number: 4,871,035

[45] Date of Patent: Oct. 3, 1989

[54] DAMPING DEVICE FOR A PERCUSSION ROCK DRILLING MACHINE

[75] Inventor: Berndt Ekwall, Saltsjöbaden, Sweden

[73] Assignee: Atlas Copco Aktiebolag, Stockholm, Sweden

[21] Appl. No.: 106,134

[22] Filed: Oct. 7, 1987

[30] Foreign Application Priority Data

Oct. 15, 1986 [SE] Sweden ................................ 8604362

[51] Int. Cl.[4] .............................................. B23B 45/16

[52] U.S. Cl. ..................................... 173/139; 92/85 B

[58] Field of Search ........................... 173/139, 1, 141; 92/85 B

[56] References Cited

U.S. PATENT DOCUMENTS 4,068,727 1/1978 Anderson et al. .............. 173/139 X

*Primary Examiner*—Frank T. Yost
*Assistant Examiner*—Willmon Fridie, Jr.
*Attorney, Agent, or Firm*—Eric Y. Munson

[57] ABSTRACT

Damping device for a percussion rock drilling machine. A damper piston (22) and a compressed air cushion in a damping chamber (23) transfer feeding force from the drill machine housing (11) to the drill string (15). A venting valve (51) is arranged for venting the damping chamber (23) after which the damping chamber can be pressurized with a selectable pressure.

10 Claims, 2 Drawing Sheets

DAMPING DEVICE FOR A PERCUSSION ROCK DRILLING MACHINE

The present invention relates to a device for a percussion rock drilling machine for transferring feeding force to a drill string comprising a damping chamber operatively connected between a feeding force influenced means and the drill string and a valve means for controlling the supply of pressure gas from a supply conduit to the damping chamber, whereby the drill string by the gas pressure in the damping chamber is pushed forward when feeding force is not applied, but is balanced on the gas pressure when normal feeding force is applied.

Such a device is known through US-A-4 068 727. The above mentioned valve means is a check valve, which lets compressed air into the damping chamber if the pressure in the damping chamber is lower than the supply pressure.

A drawback with this prior art technique is that the drilling machine works in its most efficient way only with normal feeding force. If, for instance, at drilling, cracked rock is encountered, the feeding force should be reduced in order to avoid that the drill bit gets stuck and in order to obtain optimal drilling rate. The pressure in the damping chamber should then be reduced so that the drill string balances on the gas pressure in the damping chamber.

The present invention aims at achieving optimal drilling rate at the chosen feeding force. This is achieved with the means given in the characterizing part of claim 1.

Figure 1:
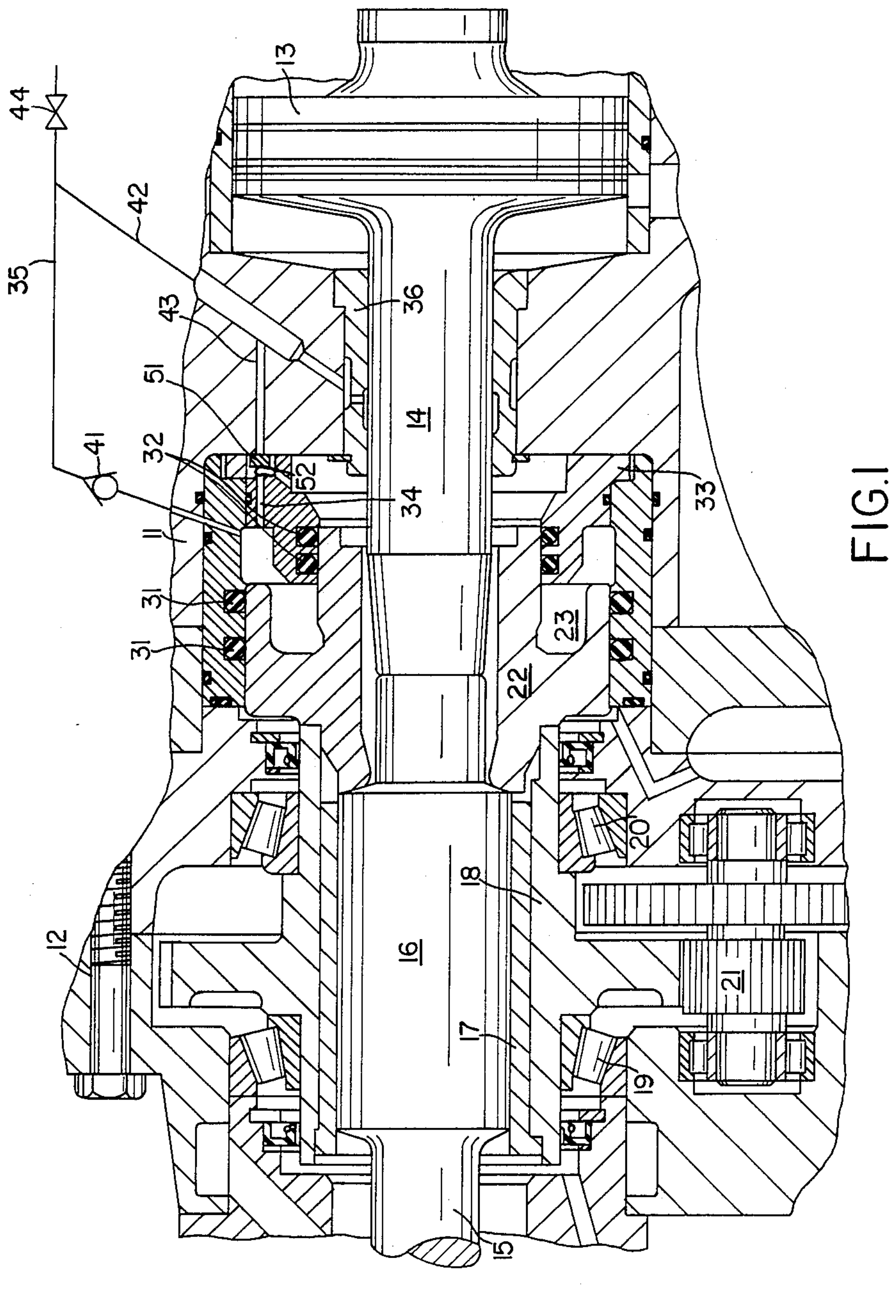
Figure 2:
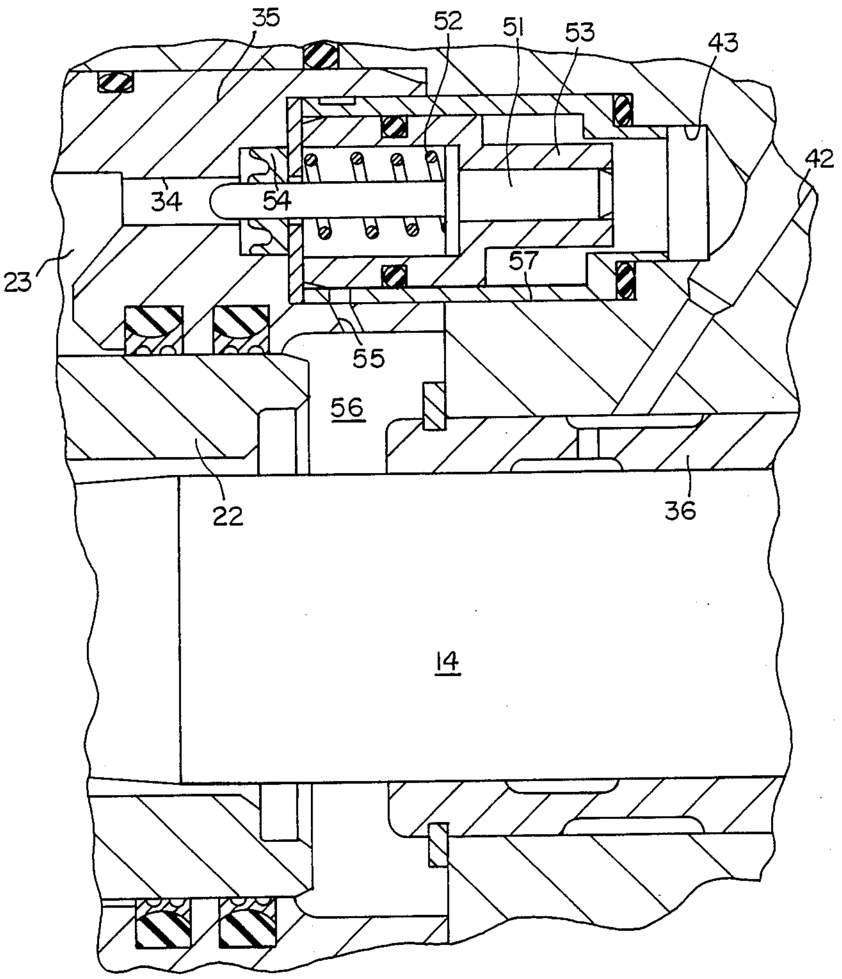

An embodiment of the invention is described below with reference to the accompanying drawings in which FIG. 1 shows a longitudinal section through a part of a compressed air driven rock drilling machine with a device according to the invention. FIG. 2 shows on a larger scale a part of the section according to FIG. 1.

In FIG. 1 a part of the housing 11 of the rock drilling machine is shown. The housing comprises several parts screwed or clamped together. A screw 12 for keeping the housing 11 together is shown in the figure. In the housing 11 there is a compressed air driven hammer piston 13 having a piston rod 14 which repetitively strikes on an adapter 15 to which a drill string is screwed so that the adapter 15 forms a part of the drill string. The adapter has a widened part 16 with noncircular crossection cooperating with a wear sleeve 17 of bronze having the same form. The wear sleeve forms a part of a drill chuck or a drill sleeve 18 which is rotatably journalled in the housing in bearings 19,20. The drill chuck 18 is rotated by a not shown compressed air driven motor via a gear change with a gear 21 cooperating with the drill chuck. The widened part 16 of the adapter 15 is from behind supported by a support piston 22 which is pushed forward by the pressure in chamber 23. Chamber 23 is sealed off by two pairs of seals 31 and 32 respectively against their wear surfaces. Compressed air with lubrication oil added is supplied to a guide bushing 36 for the piston rod 14 of the hammer piston via a channel 42 and via a channel 35 and a check valve 41 to the damping chamber 23. Channel 35 should be connected such that it is pressurized also when the hammer device is not in operation. Conduit 35 can for instance be supplied with lubrication oil added air through a seperate supply conduit as described in U.S. Pat. No.-A-3,983,788. Alternatively conduit 35 can be connected to the inlet of the hammer device if the hammer device is supplied with oil added air.

In housing 11 there is a part 33 in which a venting channel 34 is arranged. The venting of damping chamber 23 through channel 34 is controlled by a venting means in form of a valve element 51. Element 51 is biassed to the right in the figure by a spring 52 to achieve venting of chamber 23. The force from the spring is opposed by the pressure in channel 43 and thus by the pressure in supply conduit 35. Valve 44 in supply conduit 35 is used partly to depressurize conduits 35,42,43, whereby damping chamber 23 is vented, and partly to adjust the pressure level with which the damping chamber is pressurized. If the pressure level in the damping chamber is to be increased the setting of valve 44 is changed only. If the pressure level is to be decreased valve 44 is closed so that the damping chamber is vented. Then the valve is adjusted to the correct pressure level after which the valve is opened so that the damping chamber is pressurized with the selected pressure level.

The venting valve is shown on a larger scale in FIG. 2. It comprises a pin 51 pressed into a sleeve 53 which is reciprocably movable in the cylinder 57. When the valve is in its closed position, pressed towards the left by the pressure in channel 43, pin 51 extends sealingly into the lip seal 54. When channel 43 is depressurized pin 51 and thus sleeve 53 are pushed towards the right by spring 52. Pin 51 glides out of lip seal 54, whereby damping chamber 23 is depressurized through channels 34 and 55 to the vented room 56.

When drilling is begun and feeding force is applied to the drilling machine housing 11 this will be moved forwards and when the drill string starts taking up feeding force, i.e. is pushed against the rock, the support piston 22 will be moved backwards in the drill machine housing 11 and become floating on an air cushion. Chamber 23 and the efficient piston area of the support piston 22 in chamber 23 must be dimensioned so that the support piston remains floating on an air cushion and cannot be pressed against a rearward end position by the feeding force. The support piston must in its floating position be so far pushed in that it does not reach its forward end position but remains floating. This means practically that the pushing in should be at least 3–4 mm since the shock wave normally results in a compression of 1–1.5 mm.

During drilling the drilling machine housing will be exerted to recoil forces from the operation of the hammer piston and it will tend to moving backwards when the hammer piston is accelerated forwards. Since the support piston is floating on an air cushion the drill string will continuously be exerted to a feeding force even if the drilling machine housing vibrates axially. Furthermore, shock waves (compression waves) reflecting against the rock and moving backwards through the drill string will not be directly transmitted to the drilling machine housing 11 but must pass through the air cushion which means a damping.

I claim:

1. Device for a percussion rock drilling machine for transferring a feeding force to a drill string (15), said device comprising a damping chamber (23) operatively connected between a feeding force influenced means (11) and the drill string and valve means (41) for controlling the supply of pressure gas from a supply conduit (35) to the damping chamber, the drill string being movable by the gas pressure in the damping chamber when the feeding force is not applied but being balanced by the gas pressure when normal feeding force is applied, said device characterized by valve means operatively associated with said damping chamber for venting the damping chamber (23), said valve means allowing pressurization of the damping chamber at a selectable pressure level after said damping chamber is vented.

2. Device according to claim 1, characterized by a support sleeve (22) arranged with a piston area in the damping chamber (23) to be pushed forward by the gas pressure in the damping chamber and arranged to transfer feeding force to the drill string (15).

3. Device according to claim 1, characterized in that said feeding force influenced means is the housing (11) of the drilling machine.

4. Device according to claim 2, characterized in that said support sleeve (22) and the damping chamber (23 are positioned in the housing (11) of the drilling machine.

5. Device according to claim 1, characterized in that said valve means comprises a valve element (51) for controlling the venting of said damping chamber (23), said valve element being biased by a spring (52) in a direction to cause venting of the damping chamber and said spring being loaded by the gas pressure in said supply conduit (35) in a direction opposed to the bias of the spring to prevent venting of the damping chamber.

6. Device according to claim 2, characterized in that said feeding force influenced means is the housing (11) of the drilling machine.

7. Device according to claim 3, characterized in that said support sleeve (22) and the damping chamber (23) are positioned in the housing (11) of the drilling machine.

8. Device according to claim 2, characterized in that said valve means comprises a valve element (51) for controlling the venting of said damping chamber (23), said valve element being biased by a spring (52) in a direction to cause venting of the damping chamber and said spring being loaded by the gas pressure in said supply conduit (35) in a direction opposed to the bias of the spring to prevent venting of the damping chamber.

9. Device according to claim 3, characterized in that said valve means comprises a valve element (51) for controlling the venting of said damping chamber (23), said valve element being biased by a spring (52) in a direction to cause venting of the damping chamber and said spring being loaded by the gas pressure in said supply conduit (35) in a direction opposed to the bias of the spring to prevent venting of the damping chamber.

10. Device according to claim 4, characterized in that said valve means comprises a valve element (51) for controlling the venting of said damping chamber (23), said valve element being biased by a spring (52) in a direction to cause venting of the damping chamber and said spring being loaded by the gas pressure in said supply conduit (35) in a direction opposed to the bias of the spring to prevent venting of the damping chamber.

* * * * *